US008852322B2

(12) United States Patent
Gupta et al.

(10) Patent No.: US 8,852,322 B2
(45) Date of Patent: Oct. 7, 2014

(54) GAS PURIFICATION PROCESS UTILIZING ENGINEERED SMALL PARTICLE ADSORBENTS

(75) Inventors: Ramesh Gupta, Berkley Heights, NJ (US); Harry W. Deckman, Clinton, NJ (US); Daniel P. Leta, Flemington, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 243 days.

(21) Appl. No.: 13/406,135

(22) Filed: Feb. 27, 2012

(65) Prior Publication Data

US 2012/0222555 A1   Sep. 6, 2012

Related U.S. Application Data

(60) Provisional application No. 61/447,806, filed on Mar. 1, 2011, provisional application No. 61/447,812, filed on Mar. 1, 2011, provisional application No. 61/447,824, filed on Mar. 1, 2011, provisional application No. 61/447,848, filed on Mar. 1, 2011, provisional application No. 61/447,869, filed on Mar. 1, 2011, provisional application No. 61/447,835, filed on Mar. 1, 2011, provisional application No. 61/447,877, filed on Mar. 1, 2011.

(51) Int. Cl.
| *B01D 53/02* | (2006.01) |
| *B01J 20/34* | (2006.01) |
| *C10L 3/10* | (2006.01) |
| *B01D 53/047* | (2006.01) |
| *B01J 20/22* | (2006.01) |
| *B01J 20/28* | (2006.01) |
| *B01D 53/04* | (2006.01) |
| *C01B 17/04* | (2006.01) |
| *B01J 20/20* | (2006.01) |
| *B01J 20/18* | (2006.01) |
| *B01D 53/52* | (2006.01) |
| *C01B 17/16* | (2006.01) |

(52) U.S. Cl.
CPC .......... *B01D 53/047* (2013.01); *B01J 20/3491* (2013.01); *B01D 2253/102* (2013.01); *B01D 2259/40052* (2013.01); *B01D 2257/102* (2013.01); *B01D 2253/116* (2013.01); *B01J 2220/42* (2013.01); *C10L 3/103* (2013.01); *B01D 2252/20436* (2013.01); *C10L 3/105* (2013.01); *B01D 2256/245* (2013.01); *B01D 2253/106* (2013.01); *B01D 2259/41* (2013.01); *B01D 2259/40022* (2013.01); *B01D 53/0473* (2013.01); *B01J 2220/56* (2013.01); *B01J 20/226* (2013.01); *B01J 20/28078* (2013.01); *B01D 2253/204* (2013.01); *B01D 2257/7022* (2013.01); *B01D 2259/402* (2013.01); *B01J 2220/46* (2013.01); *B01D 53/0438* (2013.01); *B01D 2253/108* (2013.01); *B01D 2253/304* (2013.01); *C01B 17/0408* (2013.01); *B01J 20/20* (2013.01); *B01D 53/0462* (2013.01); *B01J 20/186* (2013.01); *B01J 20/28042* (2013.01); *B01J 20/18* (2013.01); *Y02C 10/08* (2013.01); *B01J 2256/24* (2013.01); *B01D 2252/20489* (2013.01); *B01D 2257/304* (2013.01); *B01D 53/526* (2013.01); *B01D 2253/34* (2013.01); *B01J 20/3416* (2013.01); *B01J 20/3408* (2013.01); *B01D 2253/306* (2013.01); *C10L 3/104* (2013.01); *B01D 2253/1085* (2013.01); *B01D 2252/20431* (2013.01); *B01D 2257/504* (2013.01); *C01B 17/167* (2013.01); *B01D 2253/25* (2013.01); *B01J 20/28057* (2013.01); *B01J 20/3483* (2013.01); *B01D 2253/311* (2013.01)
USPC ........ 95/136; 95/90; 95/139; 96/108; 96/153; 96/154; 502/60; 502/401; 502/407; 428/403; 156/62.2

(58) Field of Classification Search
CPC ........... B01D 53/0438; B01D 53/0473; B01D 53/047; B01D 53/526; B01D 53/0462; B01D 2256/245; C10L 3/105; C10L 3/103; C10L 3/104; B01J 20/18
USPC ................ 95/90, 136, 139; 96/108, 153, 154; 502/60, 401, 407; 428/403; 156/62.2
See application file for complete search history.

(56) References Cited

U.S. PATENT DOCUMENTS

| | | | |
|---|---|---|---|
| 2,989,383 A | 6/1961 | Miller | |
| 3,594,983 A | 7/1971 | Yearout | |
| 4,094,652 A | 6/1978 | Lowther | |
| 4,269,611 A | 5/1981 | Anderberg | |
| 4,312,641 A | 1/1982 | Verrando et al. | |
| 4,329,158 A | 5/1982 | Sircar | |
| 4,350,501 A | 9/1982 | Bannon | |
| 4,424,837 A | 1/1984 | Farrell | |
| 4,433,707 A | 2/1984 | Farnham | |
| 4,702,903 A | 10/1987 | Keefer | |
| 4,729,982 A | 3/1988 | Thistlethwaite et al. | |
| 4,753,919 A | 6/1988 | Whittenberger | |
| 4,772,579 A | 9/1988 | Thistlethwaite et al. | |
| 4,801,308 A | 1/1989 | Keefer | |
| 4,914,218 A | 4/1990 | Kumar et al. | |
| 4,968,329 A | 11/1990 | Keefer | |
| 5,057,296 A | 10/1991 | Beck | |
| 5,074,892 A | 12/1991 | Leavitt | |
| 5,082,473 A | 1/1992 | Keefer | |
| 5,089,034 A | 2/1992 | Markovs et al. | |
| 5,098,684 A | 3/1992 | Kresge et al. | |
| 5,102,643 A | 4/1992 | Kresge et al. | |
| 5,108,725 A | 4/1992 | Beck et al. | |
| 5,141,725 A | 8/1992 | Ramprasad et al. | |
| 5,171,333 A | 12/1992 | Maurer | |
| 5,225,174 A | 7/1993 | Friesen et al. | |
| 5,256,172 A | 10/1993 | Keefer | |
| 5,516,745 A | 5/1996 | Friesen et al. | |
| 5,626,033 A | 5/1997 | Tamhankar et al. | |
| 5,718,872 A | 2/1998 | Khanmamedov | |
| 5,846,295 A | 12/1998 | Kalbassi et al. | |
| 5,958,368 A | 9/1999 | Ryoo et al. | |
| 6,051,050 A | 4/2000 | Keefer et al. | |
| 6,063,161 A | 5/2000 | Keefer et al. | |
| 6,077,457 A | 6/2000 | Friesen et al. | |
| 6,080,226 A | 6/2000 | Dolan et al. | |
| 6,136,222 A | 10/2000 | Friesen et al. | |
| 6,197,092 B1 | 3/2001 | Butwell et al. | |
| 6,284,021 B1 * | 9/2001 | Lu et al. | 95/96 |
| 6,293,998 B1 | 9/2001 | Dolan et al. | |
| 6,315,817 B1 | 11/2001 | Butwell et al. | |
| 6,406,523 B1 | 6/2002 | Connor et al. | |
| 6,475,265 B1 | 11/2002 | Baksh et al. | |
| 6,514,318 B2 | 2/2003 | Keefer | |
| 6,596,054 B2 * | 7/2003 | Flippo et al. | 95/54 |
| 6,607,584 B2 | 8/2003 | Moreau et al. | |
| 6,629,525 B2 | 10/2003 | Hill et al. | |
| 6,651,658 B1 | 11/2003 | Hill et al. | |
| 6,652,627 B1 | 11/2003 | Tonkovich et al. | |
| 6,691,702 B2 | 2/2004 | Appel et al. | |
| 7,049,259 B1 | 5/2006 | Deckman et al. | |
| 7,231,784 B2 | 6/2007 | Howard et al. | |
| 7,270,792 B2 | 9/2007 | Deckman et al. | |
| 7,491,250 B2 | 2/2009 | Hershkowitz et al. | |
| 7,507,274 B2 | 3/2009 | Tonkovich et al. | |
| 7,524,358 B2 | 4/2009 | Saxena et al. | |
| 7,527,670 B2 | 5/2009 | Ackley et al. | |
| 7,799,730 B2 | 9/2010 | Ringer et al. | |
| 7,803,215 B2 | 9/2010 | Russell et al. | |
| 7,938,886 B2 | 5/2011 | Hershkowitz et al. | |
| 7,959,720 B2 | 6/2011 | Deckman et al. | |
| 2003/0015093 A1 | 1/2003 | Wegeng et al. | |
| 2003/0116016 A1 | 6/2003 | Monzyk et al. | |
| 2005/0045030 A1 | 3/2005 | Tonkovich et al. | |
| 2006/0075777 A1 | 4/2006 | Howard et al. | |
| 2006/0102519 A1 | 5/2006 | Tonkovich et al. | |
| 2006/0162556 A1 | 7/2006 | Ackley et al. | |
| 2006/0165574 A1 | 7/2006 | Sayari | |
| 2006/0210454 A1 | 9/2006 | Saxena et al. | |
| 2006/0249020 A1 | 11/2006 | Tonkovich et al. | |
| 2007/0085227 A1 | 4/2007 | Tonkovich et al. | |
| 2007/0240449 A1 | 10/2007 | Howard et al. | |
| 2007/0246106 A1 | 10/2007 | Tonkovich et al. | |
| 2008/0028286 A1 | 1/2008 | Chick | |
| 2008/0282884 A1 | 11/2008 | Kelley et al. | |
| 2008/0282885 A1 | 11/2008 | Deckman et al. | |
| 2008/0282886 A1 | 11/2008 | Reyes et al. | |
| 2008/0282887 A1 * | 11/2008 | Chance et al. | 95/98 |
| 2008/0282892 A1 | 11/2008 | Deckman et al. | |
| 2008/0314245 A1 | 12/2008 | Hershkowitz et al. | |
| 2009/0151562 A1 | 6/2009 | Russell et al. | |
| 2009/0211441 A1 | 8/2009 | Reyes et al. | |
| 2009/0217691 A1 | 9/2009 | Schmidt et al. | |
| 2009/0294348 A1 | 12/2009 | Krogue et al. | |
| 2009/0308248 A1 | 12/2009 | Siskin et al. | |
| 2009/0326279 A1 | 12/2009 | Tonkovich et al. | |
| 2010/0251887 A1 | 10/2010 | Jain | |
| 2010/0263534 A1 | 10/2010 | Chuang | |
| 2010/0292072 A1 | 11/2010 | Gray et al. | |
| 2010/0326272 A1 | 12/2010 | Asaro et al. | |
| 2012/0308456 A1 | 12/2012 | Leta et al. | |

FOREIGN PATENT DOCUMENTS

| | | |
|---|---|---|
| CN | 101475430 A | 7/2009 |
| EP | 1 421 986 B1 | 5/2004 |
| EP | 1080771 B1 | 10/2007 |
| JP | 2000317244 A | 11/2000 |
| JP | 2002326810 A | 11/2002 |
| WO | 92/05859 | 4/1992 |
| WO | 96/14917 | 5/1996 |
| WO | 2002/087730 A2 | 11/2002 |
| WO | 2005/061100 A1 | 7/2005 |
| WO | 2008/000380 A1 | 1/2008 |
| WO | 2008/143826 A1 | 11/2008 |
| WO | 2008/143966 A1 | 11/2008 |
| WO | 2009/105251 A1 | 8/2009 |
| WO | 2010/064121 A8 | 6/2010 |
| WO | 2010/096916 A1 | 9/2010 |
| WO | 2010/130787 A1 | 11/2010 |

OTHER PUBLICATIONS

Rezaei F. et al.: "Structured absorbents in gas separation processes". Separation and Purification Technology, Elsevier Science, Amsterdam, NL, vol. 70, No. 3, Jan. 12, 2012, pp. 243-256, ISSN: 1383-5866.

Ruthven, D. M., Thaeron, C. "Performance of a parallel passage adsorbent contactor", Separation and Purification Technology, vol. 12 (1997), pp. 43-60.

Suib, Steven L., O'Young, Chi-Lin "Synthesis of Octahedral Molecular Sieves and Layered Materials", Marcel Dekker, Inc., vol. 69 (1997), pp. 215-231.

Zhao, Dongyuan, Feng, Jianglin, Huo, Qishing, Melosh, Nicholas, Fredrickson, Glenn H., Chmelka, Bradley F., Stucky, Galen D. "Triblock Copolymer Syntheses of Mesoporous Silica with Periodic 50 to 300 Angstrom Pores", Science, vol. 279 (Jan. 23, 1998), pp. 548-552.

Zamani, Cyrus, Illa, Xavi, Abdollahzadeh-Ghom, Sara, Morante, J. R., Rodriguez, Albert Romano "Mesoporous Silica: A Suitable Adsorbent for Amines", Nanoscale Res Lett, vol. 4 (2009), pp. 1303-1308.

Santos, Monica S., Grande, Carlos A., Rodrigues, Alirio E. "New cycle configuration to enhance performance of kinetic PSA processes", Chemical Engineering Science 66 (2011) pp. 1590-1599.

Helen Y. Huang, Ralph T. Yang, Daniel Chinn and Curtis L. Mundson, "Amine-grafted MCM-48 and silica xerogel as superior sorbents for acidic gas removal from natural gas", Ind. Eng. Chem. Res., (2003) vol. 42, pp. 2427-2433.

\* cited by examiner

*Primary Examiner* — Christopher P Jones (74) *Attorney, Agent, or Firm* — Bruce M. Bordelon; David M. Weisberg

(57) ABSTRACT

A gas separation process uses a structured particulate bed of adsorbent coated shapes/particles laid down in the bed in an ordered manner to simulate a monolith by providing longitudinally extensive gas passages by which the gas mixture to be separated can access the adsorbent material along the length of the particles. The particles can be laid down either directly in the bed or in locally structured packages/bundles which themselves are similarly oriented such that the bed particles behave similarly to a monolith but without at least some disadvantages. The adsorbent particles can be formed with a solid, non-porous core with the adsorbent formed as a thin, adherent coating on the exposed exterior surface. Particles may be formed as cylinders/hollow shapes to provide ready access to the adsorbent. The separation may be operated as a kinetic or equilibrium controlled process.

27 Claims, 3 Drawing Sheets

GAS PURIFICATION PROCESS UTILIZING ENGINEERED SMALL PARTICLE ADSORBENTS

CROSS-REFERENCE TO RELATED APPLICATION

This application claims priority to U.S. Provisional Ser. No. 61/447,806 filed Mar. 1, 2011, herein incorporated by reference in its entirety. This application further claims priority to related U.S. Ser. Nos. 61/447,877, 61/447,812, 61/447,824, 61/447,848, 61/447,869, and 61/447,835, each filed Mar. 1, 2011, and each being incorporated by reference herein in its entirety, as well as the six U.S. non-provisional applications filed on even date herewith and claiming priority thereto, each of which being additionally incorporated by reference herein in their entirety.

This application is further related to U.S. Ser. Nos. 61/448,117, 61/448,120, 61/448,121, 61/448,123, and 61/448,125, each filed Mar. 1, 2011, 61/594,824 filed Feb. 3, 2012, and the application entitled "Apparatus and Systems having a Rotary Valve Assembly and Swing Adsorption Processes Related Thereto" by Robert F. Tammera et al. filed on even date herewith, each being incorporated by reference herein in its entirety, as well as any U.S. non-provisional applications claiming priority thereto and presumably filed on even date herewith, each of which being additionally incorporated by reference herein in their entirety.

FIELD OF THE INVENTION

This invention relates to gas purification processes and more particularly to processes for purifying natural gas streams by the removal of contaminants using a solid adsorbent material.

BACKGROUND OF THE INVENTION

Gas streams frequently require purification to remove undesirable contaminants; for example, contaminants that are frequently to be removed from gas streams include acidic compounds such as hydrogen sulfide, sulfur dioxide, and carbon dioxide. These components are frequently found in natural gas and have to be brought down to low levels before the gas can be sent through transmission pipelines; hydrogen sulfide often requires separation from gas streams produced in petroleum refining operations such as hydrotreating. Adsorptive gas separation techniques are common in various industries using solid sorbent materials such as activated charcoal or a porous solid oxide such as alumina, silica-alumina, silica, or a crystalline zeolite such as zeolite A, which can be far more economical in most cases than cryogenic separation.

Adsorptive separation may be achieved, as noted by Yang by three mechanisms, steric, equilibrium, or kinetic: R. T. Yang, *Gas Separation by Adsorption Processes*, Imperial College Press, 1997, ISBN: 1860940471, ISBN-13: 9781860940477. A large majority of processes operate through the equilibrium adsorption of the gas mixture and kinetic separations have lately attracted considerable attention with the development of functional microporous adsorbents and efficient modeling tools. Relatively few steric separation processes have been commercialized. Kinetically based separation involves differences in the diffusion rates of different components of the gas mixture and allows different species to be separated regardless of similar equilibrium adsorption parameters. Kinetic separations utilize molecular sieves as the adsorbent since they exhibit a distribution of pore sizes which allow the different gaseous species to diffuse into the adsorbent at different rates while avoiding exclusion of any component of the mixture. Kinetic separations can be used for the separation of industrial gases, for example, for the separation of nitrogen from air and argon from other gases. In the case of the nitrogen/oxygen separation (for example, oxygen and nitrogen differ in size by only 0.02 nm), the separation is efficient since the rate of transport of oxygen into the carbon sieve pore structure is markedly higher than that of nitrogen. Hence, the kinetic separation works, even though the equilibrium loading levels of oxygen and nitrogen are virtually identical.

Kinetically based separation processes may be operated, as noted in U.S. Patent Application Publication No. 2008/0282884, as pressure swing adsorption (PSA), temperature swing adsorption (TSA), partial pressure swing or displacement purge adsorption (PPSA) or as hybrid processes comprised of components of several of these processes. These swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA) technologies, with the term "swing adsorption" taken to include all of these processes and combinations of them.

In the case of kinetic-controlled PSA processes, the adsorption and desorption are more typically caused by cyclic pressure variation, whereas in the case of TSA, PPSA and hybrid processes, adsorption and desorption may be caused by cyclic variations in temperature, partial pressure, or combinations of pressure, temperature and partial pressure, respectively. In the exemplary case of PSA, kinetic-controlled selectivity may be determined primarily by micropore mass transfer resistance (e.g., diffusion within adsorbent particles or crystals) and/or by surface resistance (e.g., narrowed micropore entrances). For successful operation of the process, a relatively and usefully large working uptake (e.g., the amount adsorbed and desorbed during each cycle) of the first component and a relatively small working uptake of the second component may preferably be achieved. Hence, the kinetic-controlled PSA process requires operation at a suitable cyclic frequency, balancing the avoidance of excessively high cycle frequency where the first component cannot achieve a useful working uptake with excessively low frequency where both components approach equilibrium adsorption values.

Some established kinetic-controlled PSA processes use carbon molecular sieve adsorbents, e.g., for air separation with oxygen comprising the first more-adsorbed component and nitrogen the second less adsorbed component. Another example of kinetic-controlled PSA is the separation of nitrogen as the first component from methane as the second component, which may be performed over carbon molecular sieve adsorbents or more recently as a hybrid kinetic/equilibrium PSA separation (principally kinetically based, but requiring thermal regeneration periodically due to partial equilibrium adsorption of methane on the adsorbent material) over titano-silicate based adsorbents such as ETS-4 (such as disclosed in U.S. Pat. Nos. 6,197,092 and 6,315,817).

The faster the beds perform the steps required to complete a cycle, the smaller the beds can be when used to process a given hourly feed gas flow. Several other approaches to reducing cycle time in PSA processes have emerged which use rotary valve technologies as disclosed in U.S. Pat. Nos. 4,801,308; 4,816,121; 4,968,329; 5,082,473; 5,256,172; 6,051,050; 6,063,161; 6,406,523; 6,629,525; 6,651,658; and 6,691,702.

A parallel channel (or parallel passage) contactor with a structured adsorbent may be used to allow for efficient mass transfer in these rapid cycle pressure swing adsorption processes. Approaches to constructing parallel passage contactors with structured adsorbents have been disclosed such as in U.S. Patent Application Publication No. 2008/0282892.

Traditionally, adsorptive separation processes use packed beds of adsorbent particulates. However, the traditional packed beds are not likely to meet the very stringent requirements for natural gas cleanup. The use of adsorbent monoliths provides one approach to designing an adsorbent bed that has low pressure drop, good flow distribution, and low dispersion. Monoliths have very low flow tortuosity and can also be engineered for almost any user specified void volume to meet a specified pressure drop. Other monolith advantages include avoidance of bed fluidization or lifting. While offering these advantages, the monoliths can also have some disadvantages. These include, (i) lack of lateral flow communication between axial flow channels which prevents self correction of any flow maldistribution, (ii) a likely more pronounced effect of obstructive fouling on flow distribution, (iii) potential thermal and mechanical stresses during pressure and thermal cycling, (iv) wall effects leading to flow leakage near the wall, (v) difficult and expensive to manufacture, (vi) difficult to apply a consistent and mechanically stable adsorbent coating within the monolith channels, and (vii) difficult loading/unloading of the monolith in the containment vessel (as compared to loose particle beds) leading to a longer turnaround time.

What is needed in the industry is a new manner in which to design, fabricate and/or load adsorbents beds which have process benefits of structured adsorbent beds, such as monoliths, but solve many of the fabrication, structural, and process operational problems associated with adsorbent monoliths.

SUMMARY OF THE INVENTION

A technique has been developed for overcoming many of the problematic characteristic limitations of adsorbent monoliths by using an bed of a particulate adsorbent comprising adsorbent particles that are structured with a thin film coating of the adsorbent material on the surface of a low permeability core with a minimum cross-sectional dimension of the particle preferably less than 1 centimeter and greater than 100 microns. The thin adsorbent film on the exterior surfaces of the cores can preferably have a characteristic thickness in the range from about 1-1000 microns, e.g., from about 25-500 microns. In a preferred form, the structured adsorbent particles can be formed with a solid, non-porous core with the adsorbent formed as a thin, adherent coating on the exposed exterior surfaces of the particles. Particles may be typically formed as cylinders or prismatic hollow shapes to provide ready access by the gas mixture to the adsorbent.

The use of the adsorbent in the form of a film of controlled thickness on the surface of a core having a low permeability can have significant advantages in rapid cycle adsorption processes with cycle durations typically less than one minute and often rather less. By using a thin film, heat accumulation and retention of the adsorbent can be reduced so that exotherms and hot spots in the adsorbent bed can be reduced/minimized and the need for heat sinks such as the aluminum spheres can be reduced/eliminated by suitable choice of the core material; rapid cycling can be facilitated by the fast release of heat from the surface coating and the relatively thin layer proximate the surface of the core. A further advantage secured by the use of relatively low permeability (substantially non-porous) cores can be that entry of the gas into the interior pore structure of the core material can be largely inhibited and mass and heat transfer can take place more readily in the thin surface layer; retention of gas within the core structure can be reduced/minimized. The adsorbent layer itself may, however, be a porous material, e.g., microporous, mesoporous, or mixed matrix material: the important consideration is that it be present in the form of the thin coating formed on the surface of the solid, shaped core. These adsorbents may be used in kinetically-controlled and equilibrium-controlled gas separations.

The present gas separation apparatus and processes utilize a very thin layer adsorbent on particles that can have the additional ability to be easily utilized in existing conventional packed bed equipment and processes, but which engineered adsorbent particles can still be assembled to form a pseudo monolith useful for the desired separation of the components of the gas mixture. The separation may be operated on a kinetically-controlled or an equilibrium-controlled basis, or even a combination of the two as a hybrid process. The invention can be applicable to cyclic swing adsorption processes such as, for example, pressure swing adsorption, partial pressure purge displacement cycles, thermal swing adsorption, and combinations of these processes. These processes can preferably be operated as a rapid cycle processes. For pressure swing adsorption processes, short (rapid) cycle times can typically be less than one minute and often rather less, e.g., as short as 1 to 25 seconds. For kinetically-controlled separations, this can achieve the balance of a usefully large working uptake of the contaminant species and a relatively small working uptake of the wanted component.

The adsorbent bed can preferably be assembled with the structured adsorbent particles in an ordered arrangement with a high level of order approximating a hybrid form between a monolith and conventional random packing, yet having many of the advantages of both. In this aspect, the adsorbent bed can use adsorbent coated shapes/particles laid down in the bed in an ordered manner to simulate a monolith, or even better, the embodiments herein can simulate multiple stacked or series "micro" monoliths, by providing substantially aligned, longitudinally extensive gas channels/passages by which a gas mixture to be separated can access the adsorbent material substantially along the length of the particles. The particles can be laid down either directly in the bed or, more preferably, in locally structured regions in the form of packages/bundles which themselves can be similarly oriented such that the particles in the bed behave in a manner functionally similar to a monolith but without at least some of the associated disadvantages.

When the particles are to be formed into the packages/bundles in embodiments herein, the adsorbent particles can preferably be formed by first forming a surface coat of a suitable adsorbent material selective for adsorption of at least one of the components of the gas stream on the outsides of the particles. The coated adsorbent particles can then be laid down in a mass in the ordered configuration with the aligned gas channels. The mass of particles can then be cohered to form a coherent, self-supporting mass in which the ordered configuration is maintained so as to form the locally structured regions, which can then be assembled in an adsorption vessel to form the desired ordered adsorbent bed.

The ordered adsorbent bed can be used to advantage in kinetic-based adsorption separation gas processes where the advantages of the simulated monolith with a thin surface coating of the adsorbent material are most marked, but it may additionally or alternately be utilized in equilibrium adsorption processes and hybrid equilibrium-kinetic processes. In all these types of process, a gas mixture containing gaseous contaminants can be contacted in the ordered adsorbent bed with the adsorbent coating on the particles to effect the separation. In the kinetically-controlled process, the different components of the gas mixture can have different diffusion properties, so that at least one of the contaminants is subject to a greater diffusion rate in the adsorbent, as a result of which a gas stream containing a reduced level of the more rapidly diffused contaminant can be achieved and which less rapidly defused component can be taken off as a purified product. In the equilibrium process, the different equilibrium sorptions of the components can be utilized to effect a preferential sorption of one component over another. In hybrid processes, both physico-chemical effects can be utilized. However controlled, the process can be particularly useful for natural gas purification, to remove acidic contaminants, such as hydrogen sulfide and/or carbon dioxide, in order to produce a gas product adequate to meet transmission pipeline, industrial gas, and/or commercial gas specifications.

DETAILED DESCRIPTION OF THE EMBODIMENTS

General Considerations

The present invention has an objective of improving heat and mass transfer within the adsorbent bed and additionally or alternately reducing the difficulties in the fabrication of the adsorbent bed. Aspects of the invention can also mitigate the effects resulting from the increase in enthalpy which can take place during sorption. This enthalpy increase can inevitably cause an increase in bed temperature which, in conventional randomly packed beds and in monoliths with no heat management material present, can be as high as ~150° C., although increases of ~30-40° C. are more typical. In any event, the exotherm can reduce selectivity during the adsorption step and can lead to hot spots that can damage the adsorbent material and/or the containment vessel.

The present process uses a structured adsorbent in the form of a thin layer, e.g., from about 1 to about 1000 microns or from about 25 to 500 microns, on the surface of a core formed from a solid material whose minimum cross-sectional dimension can be less than 1 centimeter and greater than 100 microns. Characteristic dimensions of the adsorbent layer and core can be measured in optical or (more preferably) scanning electron micrographs of fractured or cross sectioned structured adsorbent particles. The thin film of adsorbent can essentially confine the adsorbed contaminant layer and can facilitate the rates of sorption and desorption; heat and mass transfer into and out of the thin adsorbent layer can take place readily, facilitating rapid cycle operation. For rapid cycle processes, the adsorbent layer can be sufficiently thin to enable molecules to diffuse into most of the adsorbent layer during the sorption step and to leave during desorption step(s). Because molecules cannot (typically) readily access the core of the particle in rapid cycle processes, it can be preferred to further limit the access of molecules into the core by forming the core from a relatively low permeability material. Non limiting examples of relatively low permeability materials can include, but are not limited to, non-porous solids as well as porous materials with internal porosity less than about 20%, e.g., less than about 10%. Additionally or alternately, the core of the particle can act as a heat sink, limiting temperature rise during the adsorption step and/or mitigating temperature decrease during desorption.

The adsorbent can be used in the form of a thin, adherent coating (for example a wash coating) of the adsorbent material on a solid support core which may be formed of a non-porous material or a porous material of the desired low permeability. A wide variety of particle shapes can be used for the core particles including spherical, ellipsoidal, cylindrical, cubical, prismatic, polylobar, and irregular, as well as hollow shell structures in which the wall forms a diffusion barrier. For many shapes (such as spherical, cubical, and irregular), a random array of gas passages can typically be formed when the particles are loaded into the adsorption vessel. Dimensions of the gas passages, and hence the pressure drop through the adsorption bed, can be set by the characteristic dimension of the particles, the density of particle packing, and the polydispersity of the particle sizes.

The use of the adsorbent in the form of a thin external wash coat or layer on the core support material can be especially favorable for kinetic separation processes that, as noted above, rely upon the utilization of the kinetic diffusion characteristics of the components in the gas mixture coupled with the use of adsorption/desorption cycle times too short to permit the adsorbed species to reach their equilibrium concentrations. The thin external coating or layer of the adsorbent on the core support material can enhance the efficiency of the mass transport and can thereby allow rapid cycling of the adsorption/desorption steps. This can not only enable the basic separation process to function but can also increase productivity. Extended diffusion into the interior pore structure of the adsorbent is neither required nor typically desired in embodiments herein. Non-porous cores can also confer the advantages of assisting in mass transfer between the gas phase and the diffused phase, an important consideration in rapid cycle operation, and in providing a better heat sink to moderate/dissipate the heat of adsorption. In addition, the solid, non-porous core can result in a sharper front between the purified phase and the advancing phase containing the undiffused contaminant(s).

It is preferred to have an adsorbent layer of relatively uniform thickness on the adsorbent material (particles). The preferred thickness of the adsorbent layer can be set by the mass transfer coefficients, as well as the time of the key steps in the swing adsorption process (e.g., adsorption and desorption steps). Calculation of these mass transfer rate constants is well known to those having ordinary skill in the art and may additionally or alternately be derived by those having ordinary skill in the art from standard testing data. D. M. Ruthven & C. Thaeron, "Performance of a Parallel Passage Absorbent Contactor," *Separation and Purification Technology*, 12 (1997), 43-60, which is incorporated herein by reference, discloses many aspects of how the mass transfer can be affected by the thickness of the adsorbent, channel gap, and cycle time of the process. Also, U.S. Pat. No. 6,607,584, which is also incorporated by reference herein, describes the details for calculating these transfer rates and associated coefficients for a given adsorbent and the test standard compositions used for conventional PSA.

Thickness can advantageously be taken to refer to the average thickness of the adsorbent. The thickness uniformity can be assessed from measurements of the thickness of the adsorbent and/or from the way in which it is fabricated. It can be preferred in many embodiments that the thickness uniformity of the adsorbent be such that the standard deviation of its thickness is less than about 40% of the average thickness, e.g., less than about 15% or less than about 5%.

In a preferred aspect, the coated adsorbent particles can be assembled into an ordered structure which to a degree can approach the functionality of a monolith without some or all of its attendant disadvantages. As noted above, conventional monolith adsorbents have their own characteristic advantages and disadvantages, one of which is that it is difficult to form a thin and reliably uniform wash coating of adsorbent on the support, especially if the monolith has pores of relatively small diameter when the coating solution may clog the pore entrances and preclude further ingress of coating material. In this case, the adsorption characteristics of the monolith are likely to be unpredictable and less than optimal. To overcome this drawback, while retaining advantages of the monolith to a certain extent, including its low tortuosity and predictable void volume, the present particulate adsorbents can preferably be formed into a simulated monolith by laying down a layer of the adsorbent material on the surfaces of the particles and then assembling the particles into the adsorbent bed, e.g., either by packing directly into the sorption vessel in a densely packed bed or, more preferably, by forming the coated structured adsorbent particles into shaped structures which can then be packed into the vessel in the form of blocks, similarly to blocks of monolith. In effect, the conventional method of monolith fabrication can be inverted and the adsorbent coated onto the outside of the support particles and the monolith-like structure then assembled from the coated particles. In this way, not only can a more uniform coating of the essential adsorbent be achieved but the pore structure of the simulated monolith can be controlled by using particles of different shapes and surface roughness. When operating in this manner, the adsorbent particles should have a ratio of length to maximum cross-sectional dimension ratio of at least 2:1, preferably at least 5:1, and a maximum cross-sectional dimension typically not more than 5 mm, for example not more than 1 mm. After the particles are laid down in the ordered configuration with longitudinally extensive, substantially aligned gas channels, the particles can then be bundled/adhered together in the mass to form a coherent, self-supporting body. The masses can then be placed in the vessel with the gas passages aligned in the desired orientation to form an ordered adsorbent bed.

Figure 2A:
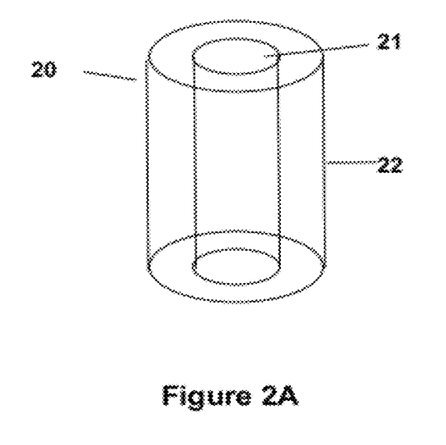
FIG. 2A is an illustration of a hollow cylindrical structured adsorbent particle suitable for use in the present invention.
Figure 2B:
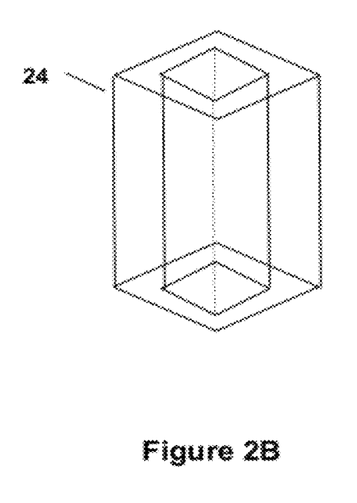
FIG. 2B is an illustration of a hollow square adsorbent particle suitable for use in the present invention.
Figure 2C:
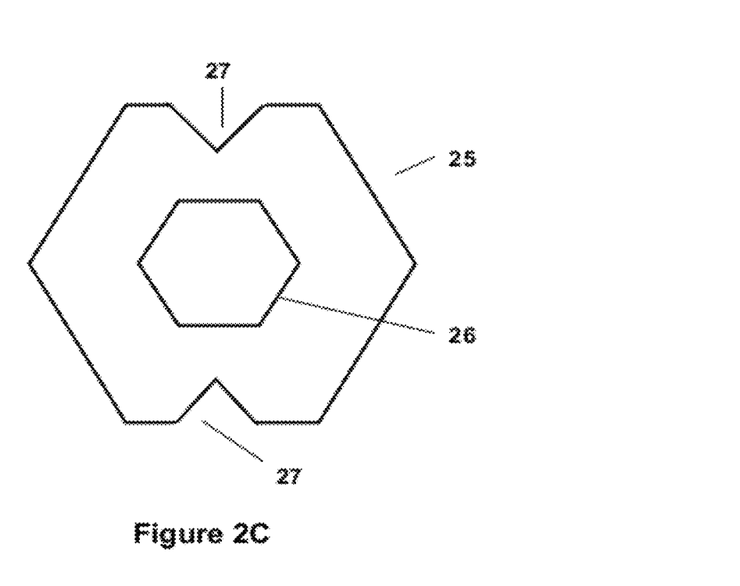
FIG. 2C is an illustration of a cross-section of a hollow hexagonal structured adsorbent particle with two grooved side walls.

If it is desired to have an ordered arrangement of the particles with longitudinal gas passages aligned with each other to permit access of the gases to the adsorbent coating substantially along the lengths of the particles and over the maximum area available for gaseous diffusion, the particles can preferably be formed with a relatively high aspect ratio of length to the maximum cross-sectional dimension, e.g., of at least 2:1, such as at least 3:1, at least 5:1, at least 10:1, or at least 20:1, with the maximum ratio potentially as high as the structural strength of the core material might permit without leading to excess breakage or attrition of the particles during loading, packing (as described below), or in use. Particles of this configuration can generally be described as cylinders or polygonal prisms with various cross-sections such as square, rectangular, pentagonal, hexagonal, octagonal, or as polylobar extrudates, (e.g., trilobe, quadlobe, or the like). Additionally or alternately, the particles may be hollow with a central gas passage which itself may be coated with the adsorbent along with the external surfaces of the particle. Longitudinal grooves may be provided in the shape so as to provide additional gas channels or passages along the exterior of the particles. Hollow particles and grooved particles should typically have a minimum wall thickness adequate to confer the desired crush strength to the particles. FIGS. 2A, 2B, and 2C illustrate examples of particle forms that may be used. FIG. 2A shows a hollow cylindrical particle, FIG. 2B a hollow square, and FIG. 2C a hollow hexagon.

Adsorbent

The adsorbent material coated onto the core particles can be selected according to the service needs, particularly the composition of the incoming gas stream, the contaminants which are to be removed and the desired service conditions, e.g., incoming gas pressure and temperature, desired product composition and pressure. Non-limiting examples of selective adsorbent materials can include, but are not limited to, microporous materials such as zeolites, metal organic frameworks, AlPOs, SAPOs, ZIFs, (Zeolitic Imidazolate Framework based molecular sieves, such as ZIF-7, ZIF-8, ZIF-22, etc.), and carbons, as well as mesoporous materials such as amine-functionalized MCM materials, and combinations and intergrowths thereof. For the acidic gases, such as hydrogen sulfide and carbon dioxide, typically found in natural gas streams, adsorbent such as cationic zeolites, amine-functionalized mesoporous materials, stannosilicates, carbons, and combinations/intergrowths thereof can be suitable.

The adsorbent coating can be in the form of individual particles (such as zeolite crystals) bound together to form a coating, a mixed matrix film containing the adsorbent particles, a porous layer having a sorbent (absorbent or adsorbent) in the pore structure, or a reasonably contiguous film of adsorbent material, as well as a combination of these structures. Non-limiting examples of mixed matrix films can include, but are not limited to, polymer films such as silicone rubber, polyimide films containing particles of zeolites such as DDR, CHA, MFI, Beta, FAU, and/or combinations or intergrowths thereof, and the like. Mixed matrix films on the exterior of the core can additionally or alternately contain pore/void structures. Examples of void structures can include voids between the polymer adsorbent particles, while pore structures can typically comprise interconnected pore networks. Examples of reasonably contiguous films of adsorbent materials can include crystalline adsorbent materials that are intergrown to form a film of adsorbent crystals, films of amorphous adsorbent materials, and the like. Intergrown films of adsorbent crystals can include zeolite films of DDR, MFI, and/or CHA grown on the exterior surface of the core. These films can additionally or alternatively contain voids/pore networks. Examples of a porous layer having an adsorbent in the pore structure can include porous alumina with an ionic liquid imbibed into the pore structure. Examples of a porous layer having an adsorbent in the pore structure can include porous alumina with small zeolite particles packed/bound into the pore structure.

Examples of suitable coating methods can include fluid phase coating techniques, such as slurry coating, slip coating, hydrothermal film formation, hydrothermal coating conversion, and hydrothermal growth. When non-hydrothermal coating techniques are used, the coating solutions can typically include the adsorbent and a viscosifying agent, such as polyvinyl alcohol, and optionally a heat transfer solid and a binder. The heat transfer solid may not be needed in situations where the core of the particle can act as its own heat sink, e.g., by storing and releasing heat in the different steps of the separation process cycle. If a viscosifying agent, such as polyvinyl alcohol, is used, it can usually burn away when the coating is cured, e.g., in a kiln. Binders such as colloidal silica and/or alumina may be used to increase the mechanical strength of the fired coating. If the adsorbent includes a microporous, mesoporous, and/or macroporous component, this can typically occupy from about 20 to about 60% (e.g., from about 20% to about 40%) of the volume of the cured coating. To reduce the void volume of coatings containing such components, a blocking agent can be applied in a separate coating process. When hydrothermal film formation methods are chosen to apply the adsorbent layer, the coating techniques used can be very similar to the way in which zeolite membranes are prepared. An example of a method for growing a zeolite layer is described in U.S. Pat. No. 7,049, 259, to which specific reference is made herein for incorporation of a description of such a method. Zeolite layers grown by hydrothermal synthesis on supports can often have cracks and grain boundaries that are mesoporous and/or macroporous in size. The volume of these pores can often be less than about 10 vol % of the film thickness, and there can often be a characteristic distance, or gap, between cracks. Thus, as-grown films can often be used directly as an adsorbent layer without the need for a blocking agent.

When the adsorbent coating is in the form of individual bound particles, the particles of the adsorbent material may be coated onto the core particles from a liquid e.g., a suspension or solution, and/or can be adhered to the particles, e.g., by physical attraction. One method for preparing a coating of individual bound particles can be to wash coat the particles onto the core. The wash coat can include binder particles that do not act as adsorbents.

When the adsorbent coating is a mixed matrix film containing adsorbent particles, it can be deposited on the cores from a slurry containing a solvent, polymer, zeolite(s) can be coated onto the surface of the core in a variety of fluid bed, and spray drying and extrusion processes. In these processes the solvent can advantageously evaporate, leaving the mixed matrix polymer and zeolite film.

If the structured adsorbent is a porous layer having an adsorbent in the pore structure, a porous inorganic oxide film can be formed on the surface of the core, and an adsorbent liquid can be imbibed into the pore structure and/or adsorbent particles can be packed/coated into the pore structure. In imbibing situations, it can be preferred for the oxide film to be chosen so that the liquid film readily invades (i.e., wets the inside of) the pore structure. It can additionally or alternatively be preferred that that the size of the pore structure can be selected to hold the liquid in place by capillary action. In coating/packing situations, coating techniques such as dry powered coating, slurry casting, and/or wash coating can be used to place adsorbent particles in the pore structure.

When the adsorbent is an intergrown film of adsorbent crystals, the coating can be produced by hydrothermal and/or solvothermal synthesis. For example, films of intergrown DDR (as well as MFI) crystals can readily be produced by hydrothermal synthesis. When the adsorbent is a film of an amorphous adsorbent material, it may be solution coated onto the core and/or formed on the core by a chemical reaction.

Particle Cores

The core material may be porous or non-porous, as long as the low permeability requirement is met for rapid cycle operation. Non-porous solid materials can be preferred for certain kinetically-controlled processes, since the diffusion path in such processes can be more limited, although at the expense of a reduced surface area so that, although the faster cycles correlated with shorter diffusion paths can be achieved, the total sorption capacity may be reduced. If a low permeability porous solid is used, it may be a conventional porous support, such as a metal(loid) oxide or mixed oxide such as alumina, silica, and silica-alumina, or a zeolite, as well as a silica having pore structure in the microporous size range. Because of the desirability of keeping the permeability relatively low, mesoporous and macroporous materials are not likely to be preferred, though they may be used to form the adsorbent layer on the core. Silica gels can be a preferred source of porous cores, since they may be obtained commercially with a range of pore sizes and permeabilities and can be suitable for forming into particles by conventional extrusion techniques.

Non-porous particle cores may be made of any suitable material, such as metal, glass, ceramic, plastic, or the like, and may be mass manufactured by extrusion, molding, or an appropriate process based on the material. Cores can be hollow shells/spheres such as microballoons (microspheres) of glass/ceramics. Cores can additionally or alternately be porous particles whose centermost portion can contains a filler such as a polymer. An additional benefit of the core structure can occur when the core material can be selected to enhance the strength of the particles. Thus, should the coating form cracks due to thermal or other stresses, the overall particle structure could be maintained. Additionally, mechanical or thermal cracks that may occur in the adsorbent layers of the embodiments herein can advantageously be limited to within each individual particle alone, in contrast to cracks or failures of adsorbent layers in monoliths that can result in significant bypassing/failure of large sections of the monolithic adsorbent layers.

Since a major function of the core can be to act as a heat sink, the thermal conductivity and thermal capacity of the core material should generally be selected in accordance with the size of the particles. Particles at the larger end of the size range can preferably have a relatively higher thermal conductivity than smaller particles, since the thermal diffusion path in the smaller particles can be limited and/or the heat transfer into and out of the particle during the cycle may not result in an accumulation of heat within the particle, even with relatively short cycle times. A related consideration here is that the size of the particles can affect the void volume; although the void ratio is not necessarily affected by changing particle size, typically mostly/only by particle geometry, the larger gas passages between the particles resulting from larger particle size may not be as favorable to fast cycle operation, since gas/particle contact can be decreased as inter-particle volume increases with the cube of linear dimension, while surface area of the particles increases only with its square. Thus, a balance can advantageously be achieved between the thermodynamics of the selected adsorption process, the desired cycle time, and the particle dimensions.

Bed Configuration

If the adsorbent particles are loaded into an ordered array in the adsorbent vessel, it can be preferred to have the gas channels/passages in the particles substantially aligned, running substantially parallel to the direction of gas flow in the vessel, e.g., radially/axially as described above; this can be particularly important for units operating on a rapid swing cycle to improve/maximize gas flux rates. The substantially aligned gas channels/passages may not be required to be completely continuous, but rather a relatively high level of order can be maintained at the macroscopic level in the orientations of the particles; it is not essential that the gas channels of one particle lead directly into the next longitudinally adjacent particle nor that the gas channels/passages be exactly aligned but that, taken as a whole, the bed can advantageously generally display this high level of order in the particle orientations.

Figure 1:
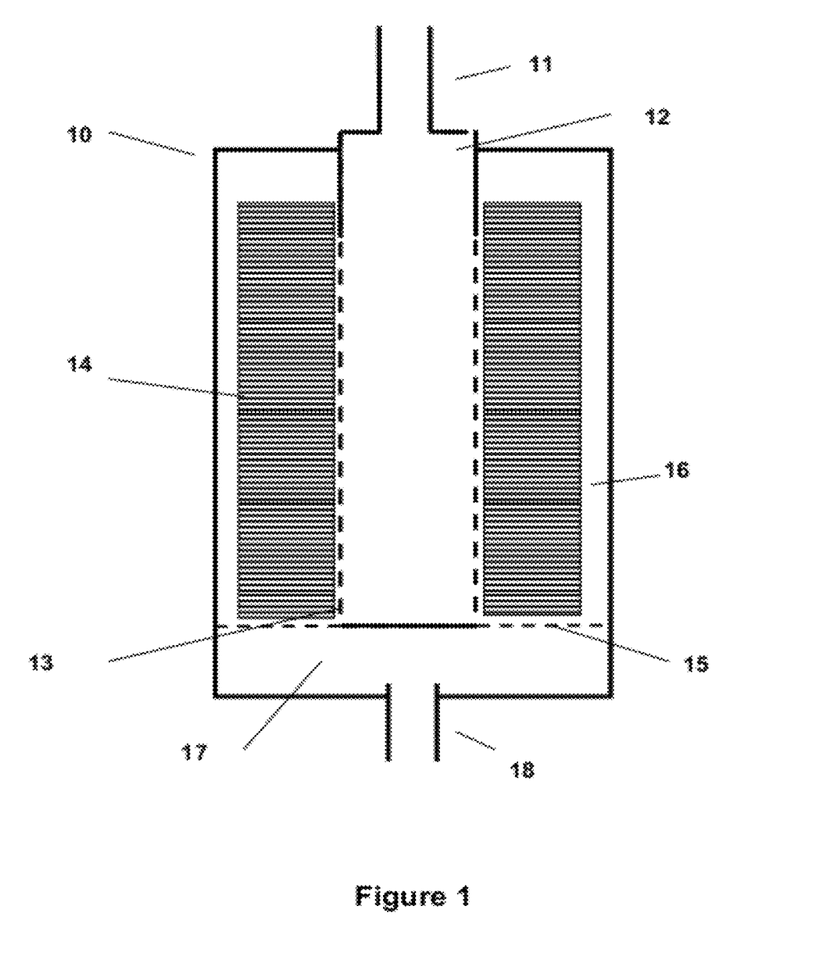
FIG. 1 is a simplified vertical section of an adsorbent module containing an ordered adsorbent bed for radial flow operation.

An exemplary adsorption module using an ordered adsorbent bed is shown in simplified form in FIG. 1. The adsorbent is contained in vessel/container 10 fitted with inlet line 11 to admit the gas mixture into the vessel. Inlet line 11 connects into internal cylindrical plenum 12 having perforated wall 13 inside the vessel to permit the incoming gas mixture to flow from the plenum into annular adsorbent bed 14, which rests on support grid 15. After passing through the adsorbent bed in a radial flow fashion, the gas mixture, depleted in the adsorbed component, is collected around the periphery of the adsorbent bed in annular plenum 16 and then passes to end plenum 17 and to outlet line 18. In operation, the module can be used to effect a separation of at least one contaminant gas from the main body of the gas to result in a stream of the purified gas as the product from line 18. In this case, the gas passages in the particles can be aligned radially with respect to one another; in an axial flow reactor, the gas passages can preferably be aligned parallel to one another as can be conveniently achieved by the use of the structured adsorbent packages/bundles described herein. In a similar manner, the adsorption module can be designed and utilized with an ordered adsorbent bed in an axial flow configuration.

One important characteristic of the present particulate adsorbent beds can be to provide gas passages to permit gas flow through/past the particles, so that the gas stream can access the adsorbent coated onto the surface of the particles. As described above, the gas passages may take the form of a network of spaces between particles, central passages in hollow particles, grooves in the side faces of the particles or combinations thereof. In typical particles, the gas passage can preferably have a maximum dimension of about 1 mm (e.g., about 0.5 mm) with individual particles having a characteristic minimum cross-sectional size from 0.2 mm to 5 mm, such as from 1 mm to 2 mm.

FIG. 2A shows hollow cylindrical particle 20 of adsorbent in which inner surface 21 and outer surface 22 are coated with a thin wash coat of the adsorbent on a hollow cylindrical solid support core, which can preferably be formed of a non-porous material. FIG. 2B shows similar hollow particle 24, in this case having a cross-section in the form of a hollow square that, again, has a wash coat of the adsorbent material on its inner and outer surfaces. Other cross-sectional configurations are possible, for example, triangles, rectangles, polygons (including, for example, pentagons, hexagons, octagons, etc.), and the like to form prismatic particles. The prisms may be hollow prisms, as shown in FIG. 2B, with a gas passageway running along the axis of the prism. Alternatively, the prisms may be made solid without a central gas passageway, and, in that case, the side faces of the prisms may be grooved to provide gas passageways. Another alternative can include the use multilobe particles, e.g., trilobe, quadlobe, or the like, which can have the advantage of a relatively large surface area to volume ratio, thus increasing/maximizing gas exposure to the adsorbent coating area.

The shape of the particle may be chosen dependent upon the pressure drop desired. For example, particles with square/rectangular cross sections can tend to bundle more tightly with a very low void space between them. When the particles are made in the form of prisms of regular polygons which together form a close pack without interstices, e.g., triangles, rectangles (including squares), or hexagons, the gas passages may be formed in several ways. For example, the side faces of the prisms may be grooved as shown in FIG. 2C, which shows regular hexagonal hollow particle 25 having central gas passage 26, as well as grooves 27, on two of its longitudinal side faces to provide additional gas passageways along the length of the particle, though at the expense of increasing the void space in the final bed. The interior surface onto central gas passage 26, as well as the outer surface, can be coated with a wash coat of the adsorbent. Alternatively, polygonal particles may have irregular sides/angles so as not to fit together with maximum compactness, in which case all exterior surfaces of the particles may advantageously be adsorbent coated allow for irregularity/randomness in particle surface exposure (some faces of the polygons can be in direct face-to-face contact, precluding passage of gas, while other faces can be held apart by the irregular cross-sections, allowing space for the gas to pass between the side faces and enter into contact with the coating of adsorbent). The external surface of the particles may additionally or alternately be corrugated and/or can have a uniform roughness (controlled height bumps) to provide gas channels of controlled dimensions.

In order to simulate a monolithic adsorbent, the present particles can be placed into an ordered, structured array with substantially aligned, parallel gas channels or passageways that are hydraulically comparable, or improved with respect, to those found in a monolith. This may be done in either or both of two ways, e.g., by ordering the particles in the adsorber vessel using a dense bed loading technique to form an adsorbent bed in which the particles in the vessel lie in substantially side-by-side orientation, and/or by forming an ordered array by bundling/packaging the particles in the desired side-by-side orientation with their gas flow passages substantially parallel to one another so as to facilitate handling and loading of the adsorbent into the adsorber vessel. The second option can be preferred, in some embodiments, since it can enable the particles to be formed into shaped blocks that can then be handled and loaded easily into the vessel, and/or to be oriented for more ready monitoring/control than when the dense bed packing is performed during the adsorbent loading of the vessel.

Dense loading can be accomplished by introducing the particles into the vessel in a manner that allows each particle to be placed onto the surface of the bed, assuming a horizontal rest position in a substantially oriented manner. This can achieve either or both of two objectives: first, the loading density can be increased with reduced void volume or fraction; and second, the particles can assume a rest position in which they are substantially aligned. Essentially, two different methods of oriented packing exist, and one or both may be used in adsorbent oriented packing: kinetic loading and gas-propelled loading. In both methods, a hopper/funnel feeds the particles into a pipe extending into the vessel which is to hold the bed. The particulate adsorbent can pass down through the pipe and can exit horizontally through an annular space/gap, which can be varied in vertical width by adjusting the spacing between the loader pipe flat deflector plate, or cone, attached to the bottom of the pipe. The particulate adsorbent can be distributed by an air motor rotating a particle distributor and propellers, rotating blades, or a series of rubber strips to distribute catalyst from the loader to the bed space in the vessel. Exemplary kinetic loading methods are shown in U.S. Pat. Nos. 4,424,837 and 4,433,707.

In a typical gas-propelled system, the propulsion gas, such as air or $N_2$, is introduced into a sparger situated in the center of the loader pipe, above the deflector plate. Jets of air emerge from horizontal radial holes in the sparger, directed outward through the annular gap. One commercial gas propulsion technique uses two deflector plates at the end of the supply pipe with the lower deflector plate feeding catalyst to the center of the vessel while the upper plate feeds catalyst to the outer walls of the vessel. Another technique uses a single deflector plate.

To load a vessel of the type shown in FIG. 1 with an annular bed of adsorbent for radial flow operation, the vessel header can be detached along with the upper portion of the central plenum and the loading system adjusted to distribute the adsorbent particles into the annular volume between the central plenum and the walls of the vessel. Alternatively, the top of central plenum can be blocked off inside the vessel with a closure cap during the loading operation. If axial flow operation is used, the loading can be simpler with the adsorbent being distributed into the volume of vessel. In each case, the elongated adsorbent particles can be laid down in a radial orientation so that the gas passages provided in the particles are essentially in alignment to provide radial gas flow paths through the bed of adsorbent. For rapid cycle operation, which is preferred with the kinetic separation, radial flow operation with its lower resistance to flow can be better.

As an example, the adsorbent particles herein may typically have a diameter from about 1 mm to about 2 mm and an L/D ratio of about 3. These particles can pack with a void fraction of about 0.42 in a randomly packed bed with raking, but a void fraction as low as 0.36 may be achieved with oriented packing when the particles are sprayed into the vessel from the top. The elongated particles can assume a hydrodynamically preferred orientation during the free fall and can pack more densely and/or in a more ordered fashion as compared to randomly packed particles. The effect of particulate orientation on void volume and tortuosity can be significantly enhanced by using particulates with a much higher L/D ratio than 3. For example, adsorption kinetic processes may use adsorbent particles with an L/D ratio of 10 or more to achieve improved/maximum benefits of oriented packing. Long adsorbent particles with oriented packing could achieve a significant degree of the advantages monolith but without some or all of its disadvantages.

A preferred alternative to the oriented or dense loading of the adsorber vessel with the loose particles can be to package or bundle the particles in a manner which retains the desired orientation of the particles with their gas pathways. Potentially, very large diameter bundles, e.g., from 1-5 meters, are contemplated. End-to-end dimensions of the bundle (in the direction of adsorbent preferred longitudinal orientation) can range from about 5 cm to about 100 cm, for example from about 10 to about 50 cm, but can be even longer, depending on the length of the adsorbent particles utilized. These packages/bundles could essentially and functionally simulate monoliths but without some/all of their manufacturing or thermal stress disadvantages. The particles may be formed into packages/bundles by loading them into a container (i) of the requisite shape for fitting into the adsorbed vessel and (ii) fabricated of a perforate material with openings large enough to permit ready passage of the gas components but small enough to contain the adsorbent particles. The particles can be loaded into the container using the dense or oriented loading technique adapted to the smaller dimensions of the container. Once the container is full, it can be closed/secured to prevent loss of the particulates in it. Suitably, the container may be made of perforated sheet material such as a perforated metal or a mesh material such as stainless steel wire mesh. The container can preferably be sufficiently rigid to maintain its shape so that the adsorbent particles are not disturbed once laid down in the container. Another and preferred option can be to cohere the particles into self-supporting masses/blocks by adhering the particles together with an adhesive that can be removed once the masses are located in place in the adsorption vessel. The adhesive may optionally be one which can be dissolved away from the particles with a solvent, e.g., water or an organic solvent, and/or one which can be melted off or even vaporized. The adhesives can be applied, for example, as the particles are extruded, e.g., by spraying or by passing the particles through a bath of the adhesive in a suitable solvent. The particles themselves can be extruded directly into a mold of the requisite, pre-determined shape in the desired orientation or charged into the mold using a small-scale adaptation of the dense packing technique in which the dynamic qualities of the particles are exploited to attain the desired alignment to the extent feasible.

The containers or cohered masses/blocks may be fabricated in a shape to suit the vessel, e.g., cubic, cuboid, or hexagonal prisms with segmental ones to fit in around the periphery of a regular array of the straight sided elements to fill out the vessel cross-section. Alternatively, the vessel may be fitted with internal baffles to keep the gas stream flowing only into the adsorbent containers. The particles in the bundles can be oriented with the gas passages in the direction(s) needed for improved or optimum gas flow in the vessel, for example, with the gas passages oriented radially in a radial flow vessel or axially in an axial flow vessel.

In order to promote temperature uniformity in the bed, the adsorbent coated particles may be coated onto plates which can act to dissipate the heat and/or carry it away from the particles and/or may be sandwiched between plates. High conductivity metals such as aluminum can be preferred for this latter duty. If the particles are formed into self-supporting pseudo monoliths or packaged into perforated containers, these may additionally or alternately be sandwiched between thermal transfer plates.

Figure 3A:
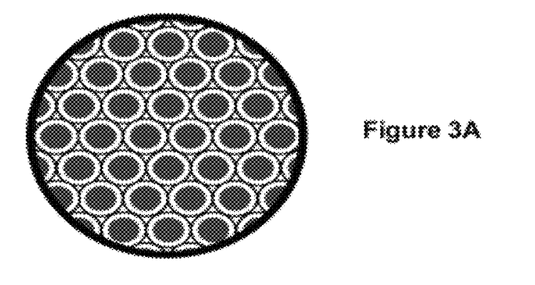
FIG. 3A is a vertical section of an array of the hollow cylinder particles of FIG. 2 arranged to form a pseudo-monolith.
Figure 3B:
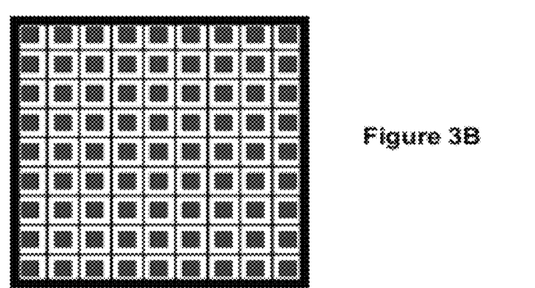
FIG. 3B is a vertical section of an array of the hollow square prism particles of FIG. 2 arranged to form a pseudo-monolith.
Figure 3C:
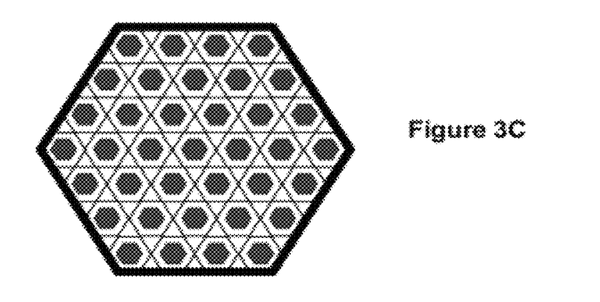
FIG. 3C is an idealized vertical section of an array of hollow hexagonal prism particles arranged to form a pseudo-monolith.

The particles, placed directly in the adsorption vessel and/or formed into block-like bundles/packages, may be manufactured and assembled for better/optimal void space in the adsorbent bed. As noted above, the better/optimum void space in the bed can be achieved by balancing various factors, such as dilution from gas remaining in the dead space and/or gas diffusion rates through the bed. The present bed assembly method can enable the void space to be manipulated in accordance with these factors. The space between the particles can be reduced, minimized, or even eliminated by using particles fitting exactly or nearly exactly together, as in the case of triangular, square, and hexagonal prisms. FIG. 3B shows that the only void space in the bed of hollow square particles is provided by the central channel down the middle of each particle, which can be set at the value needed for desired/optimal void volume, though some allowance can be made for some packing irregularity creating inter-particle voids (e.g., which can be assessed statistically by empirical means). FIG. 3C shows a rather idealized arrangement of hexagonally prismatic particles arranged so that a void fraction (excluding that of the central channels) of one third the total bed volume can be achieved (each hexagon is adjacent two triangular voids each having a volume of one-sixth of the volume of the hexagon for a total void fraction, excluding channels, of ~33%). If the hexagons were packed more densely with alternate layers displaced to give close packing, the non-channel void volume would approach zero, and so, by adjusting the size of the central channel and the closeness of the particle packing, the void volume can be incremented to the desired value for better/optimal functioning. Additionally or alternately to the central channel, the grooves shown in FIG. 2C could be used to modify the void volume; similar principles can apply to square/rectangular particles.

In the case of cylindrical particles, which can be preferred in certain embodiments for their ease of manufacture in existing equipment and/or for their ability to settle into a bed or shape of predictable packing density, the total void volume in the final bed/shape can typically depend on the degree of packing perfection. FIG. 3A shows a bed section with perfect close packing in which the ratio of the void volume to the total bed volume is:

$$\frac{2(\sqrt{3}-\pi/2)}{\pi+2(\sqrt{3}-\pi/2)}$$ (or approximately 9.3% void fraction)

Thus, the minimal pore volume with a bed of perfectly packed solid cylinders can be about 9%, which can be increased in controlled increments by adjusting the size of the central channel through the cylinders. In conventional beds, the void fraction can often be about 40%, and with dense packing can typically be about 35%. The pore fraction may be reduced to quite low values when treating natural gas, since the incoming gas stream is normally available at relatively high pressures (typically up to 7,000 kPag or even higher), so that a pressure drop of about 150 kPag to about 200 kPag can be easily tolerable. As shown above, the void fraction can be reduced in principle to zero, and so void fractions in the range from just above 0% up to 30% (e.g., from 1% to 30%, from 5% to 25%, from 5% to 20%, from 5% to 15%, or from 5% to 10%), can be achieved by the use of particles with varying cross-sectional shapes and gas passage size, in relation to the total cross-section, with additional control being achievable through particle regularity, surface roughness, and/or packing density. In general, the spacing between the particles can be determined by their general shape, and precise details of the particle cross-section can be in the range from 0.05 mm to 0.5 mm.

Pressure drops were calculated for various exemplary cases using a close-packed bed of cylindrical particles, as shown in FIG. 3A, where the diameter of the coated particles was varied from 0.5 mm to 2.0 mm. The viscosity of the flowing gas was assumed to be ~1.79×10$^{-5}$ kg/m-s. Calculations showed that, in a vessel filled with such a structured packing, about 90.7% of the vessel volume was occupied by the particles, and only the remaining ~9.3% volume was available for the gas to flow through. This ~9.3% volume essentially represented the open space in between the tightly packed cylindrical particles, significantly lower than the typical 35% plus void fraction that would be achieved in a fixed bed loaded with conventional particulate material. Table 1 below provides the calculated pressure drops per unit length (kPa/m) for a packed bed of cylindrical particles with diameters of 0.5 mm, 1.0 mm, and 2.0 mm, at different gas velocities through the ~9.3% interstitial void space. Fluid dynamic calculations showed that the flow was laminar under all flow velocities shown in Table 1 below.

TABLE 1

Pressure Drop, Cylindrical Particle Packed Bed

| Gas Velocity, m/sec | Particle Diameter, mm | | |
| --- | --- | --- | --- |
| | 0.5 | 1.0 | 2.0 |
| | Pressure Drop, kPa/m | | |
| 0.1 | 21.7 | 5.45 | 1.38 |
| 0.3 | 65.1 | 16.3 | 4.07 |
| 1.0 | 217 | 54.2 | 13.6 |

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses, and systems may be used to prepare natural gas products by removing contaminants and heavy hydrocarbons (having at least two carbon atoms). The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), thermal swing adsorption (TSA), and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;

(b) removing acid gas with RC-TSA using advanced cycles and purges as described in U.S. Provisional Application No. 61/447,858, filed Mar. 1, 2011, as well as the U.S. patent application Ser. No. 13/406,079, claiming priority thereto, which are together incorporated by reference herein in their entirety;

(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;

(d) choosing an appropriate adsorbent materials to provide high selectivity and reduce/minimize adsorption (and losses) of methane and other hydrocarbons, such as one or more of the zeolites described in U.S. Patent Application Publication Nos. 2008/0282887 and 2009/0211441, each of which is herein incorporated by reference in its entirety;

(e depressurizing one or more RC-PSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(f) using exhaust or recycle streams to minimize processing and hydrocarbon losses, such as using exhaust streams from one or more RC-PSA units as fuel gas instead of re-injecting or venting;

(g) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-PSA units with minimal purge flow rates;

(h) using feed compression before one or more RC-PSA units to achieve a desired product purity;

(j) contemporaneous removal of non-acid gas contaminants such as mercaptans, COS, and BTEX; selection processes and materials to accomplish the same;

(k) using structured adsorbents for gas-solid contactors to minimize pressure drop compared to conventional packed beds;

(l) selecting a cycle time and cycle steps based on adsorbent material kinetics; and (m) using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD.

Compared to conventional technology, the provided processes, apparatuses, and systems can require lower capital investment, lower operating cost, and/or less physical space, thereby enabling implementation offshore and in remote locations, such as arctic environments. The provided processes, apparatuses, and systems can provide the foregoing benefits, while providing high hydrocarbon recovery as compared to conventional technology.

Additionally or alternately, the invention can comprise one or more of the following embodiments.

Embodiment 1

A structured adsorbent particle comprising a thin film adsorbent coating on the exterior of a low permeability core (e.g., a substantially non-permeable, solid core), wherein a minimum cross-sectional dimension of the particle is less than 1 centimeter and greater than 100 microns.

Embodiment 2

A structured adsorbent particle according to embodiment 1, wherein the adsorbent coating has a thickness less than 1000 microns and greater than 1 micron, said thickness representing an average thickness whose uniformity is optionally such that a thickness standard deviation is less than about 40% of the average thickness.

Embodiment 3

A structured adsorbent particle according to any one of the preceding embodiments, wherein the adsorbent coating comprises a microporous material (e.g., selected from zeolites, such as selected from DDR, CHA, MFI, Beta, FAU, and combinations and intergrowths thereof; MOFs (metal organic frameworks); AlPOs; SAPOs; ZIFs (zeolitic imidazolate frameworks); and carbons), comprises a mixed matrix material (e.g., a polymer film comprising a polymer selected from silicone rubber and polyimides, and further comprising particles of zeolite, such as selected from DDR, CHA, MFI, Beta, FAU, and combinations and intergrowths thereof), and/or is comprised of an intergrown film of adsorbent crystals (e.g., comprised of a zeolite selected from DDR, MFI, CHA, and combinations and intergrowths thereof) grown directly on the exterior surface of the low permeability core.

Embodiment 4

A structured adsorbent particle according to one of the preceding embodiments, wherein a ratio of a length to maximum cross-sectional dimension of the particle is at least 5:1.

Embodiment 5

A structured adsorbent module comprising a multitude of adsorbent particles (such as adsorbent particles according to one or more of embodiments 1-5) arranged in a mass, wherein the adsorbent particles are oriented in a substantially similar direction, which mass is supported in a module configuration to substantially maintain the orientation of the adsorbent particles therein, and wherein the adsorbent particles have a ratio of a length to maximum cross-sectional dimension of at least 2:1, e.g., at least 5:1.

Embodiment 6

A structured adsorbent module according to embodiment 5, wherein the mass is supported in a module configuration by an external support and/or by cohering the particles in the mass.

Embodiment 7

A structured adsorbent module according to embodiment 5 or embodiment 6, wherein the adsorbent particle is comprised of a thin film adsorbent coating on the exterior of a low permeability core (e.g., a substantially non-permeable, solid core), wherein a minimum cross-sectional dimension of the particle is less than 1 centimeter and greater than 100 microns.

Embodiment 8

A structured adsorbent module according to embodiment 7, wherein the adsorbent coating has a thickness less than 1000 microns and greater than 1 micron (wherein said thickness represents an average thickness whose uniformity is optionally such that its standard deviation is less than about 40% of the average thickness) and/or comprises a microporous material (e.g., selected from zeolites, such as selected from DDR, CHA, MFI, Beta, FAU, and combinations and intergrowths thereof; MOFs (metal organic frameworks); AlPOs; SAPOs; ZIFs (zeolitic imidazolate frameworks); and carbons), comprises a mixed matrix material (e.g., a polymer film comprising a polymer selected from silicone rubber and polyimides, and further comprising particles of zeolite, such as selected from DDR, CHA, MFI, Beta, FAU, and combinations and intergrowths thereof), and/or is comprised of an intergrown film of adsorbent crystals (e.g., comprised of a zeolite selected from DDR, MFI, CHA, and combinations and intergrowths thereof) grown directly on the exterior surface of the low permeability core.

Embodiment 9

A structured adsorbent module according to any of embodiments 5-8, wherein an end-to-end dimension of the module (in the direction of adsorbent preferred longitudinal orientation of the particles) is from about 5 cm to about 100 cm.

Embodiment 10

A gas separation process comprising contacting a gas mixture containing at least one contaminant with an adsorbent bed (such as the adsorbent module according to any one of embodiments 5-9) of structured adsorbent particles (such as adsorbent particles according to any one of embodiments 1-4) comprising a thin film adsorbent coating on an exterior of a low permeability core (e.g., a substantially non-permeable, solid core), wherein a minimum cross-sectional dimension of the particles is less than 1 centimeter and greater than 100 microns.

Embodiment 11

A process according to embodiment 10, wherein the adsorbent coating has a thickness of less than 1000 microns and greater than 1 micron (wherein said thickness represents an average thickness whose uniformity is optionally such that its standard deviation is less than about 40% of the average thickness), e.g., less than 500 microns and greater than 25 microns, and/or comprises a microporous material and/or a mixed matrix material.

Embodiment 12

A process according to embodiment 10 or 11, wherein the adsorbent particles have a length to maximum cross-sectional dimension of the particle of at least 2:1, e.g., of at least 5:1, and are positioned in the adsorbent bed with a void fraction not more than 30%, and in an ordered configuration to provide substantially longitudinally extensive, substantially aligned gas channels by which the gas mixture to be separated can access the adsorbent material along the length of at least a proportion of the particles to cause adsorption of at least some of the contaminants and to form a purified gas product having a reduced content of the adsorbed contaminant material.

Embodiment 13

A process according to any one of embodiments 10-12, wherein the ordered adsorbent bed of particulate adsorbent particles comprises locally structured ordered regions in which the particulate adsorbent particles are laid down in an ordered configuration of substantially longitudinally extensive, substantially aligned gas channels.

Embodiment 14

A process according to any one of embodiments 10-13, wherein the adsorbent particles are in the form of hollow cylinders or hollow prismatic polygonal shapes having a central gas passage, or prismatic polygonal shapes having cross-sectional irregularities (e.g., comprising irregular lengths of polygonal sides or irregular vertex angles) that preclude maximal face-to-face contact of the particles in the ordered configuration.

Embodiment 15

A process according to any one of embodiments 10-14, wherein the adsorbent particles have surface irregularities in the form of uniform roughness that precludes maximal face-to-face contact of the particles in the ordered configuration and/or have a longitudinal dimension of at least 20 mm.

Embodiment 16

A process according to any one of embodiments 10-15, wherein the at least one contaminant is $CO_2$, $H_2S$, or a combination thereof, and/or wherein the gas mixture is natural gas.

Embodiment 17

A kinetic gas separation process which comprises contacting a stream of a gas mixture comprising natural gas containing contaminants including carbon dioxide and/or hydrogen sulfide, with an ordered adsorbent bed having a void fraction of not more than 33% and being comprised of adsorbent particles laid down in the adsorbent bed in an ordered configuration to provide substantially longitudinally extensive, substantially aligned gas channels by which the gas mixture contacts the adsorbent material along the length of at least a proportion of the particles to cause adsorption of at least some of the contaminants and to form a purified natural gas product having a reduced content of the adsorbed contaminant material.

Embodiment 18

A kinetic gas separation process according to embodiment 17, wherein the gas stream is contacted with locally structured regions of the adsorbent particles (e.g., formed by adhering together the particles with an adhesive which is removed prior to contact with the gas stream) laid down in the adsorbent bed in an ordered configuration to provide the substantially longitudinally extensive, substantially aligned gas channels to cause adsorption of at least some of the contaminants and to form a purified natural gas product having a reduced content of the adsorbed contaminant material.

Embodiment 19

A method of forming an adsorbent bed of ordered adsorbent particles for treating a gas stream to remove gaseous contaminants from the stream, which comprises laying the adsorbent particles down in a mass in an ordered configuration to provide substantially longitudinally extensive, substantially aligned gas channels by which the gas mixture contacts the adsorbent material along the length of at least a proportion of the particles, cohering the particles in the mass (e.g., by laying down the particles in the ordered configuration in a container and/or by laying down the particles in the ordered configuration and adhering the particles together, such as by means of an adhesive) to form a coherent, self-supporting mass and assembling a plurality of the masses in an adsorption vessel to form an ordered adsorbent bed.

Embodiment 20

A method of making a simulated adsorbent monolith for separating components of a gas stream, which comprises: (i) forming a coat of a adsorbent material which is selective for adsorption of at least one of the components of the gas stream on the outsides of solid, non-porous particles having a length to maximum cross-sectional dimension ratio of at least 2:1 and a maximum cross-sectional dimension of not more than 1 mm; (ii) laying the adsorbent particles down in a mass in an ordered configuration with substantially longitudinally extensive, substantially aligned gas channels by which the gas stream may contact the adsorbent material along the length of at least a proportion of the particles; (iii) externally supporting or cohering the particles in the mass to form a coherent, self-supporting mass; and (iv) assembling a plurality of the masses in an adsorption vessel to form an ordered adsorbent bed.

What is claimed is:

1. A gas separation process comprising contacting a gas mixture containing at least one contaminant with an adsorbent bed of structured adsorbent particles comprising a thin film adsorbent coating on the exterior of a low permeability core,
    wherein the adsorbent particles have:
        (i) a minimum crosssectional dimension of less than 1 centimeter and greater than 100 microns;
        (ii) a length to maximum cross-sectional dimension of at least 2:1; and
        (iii) a longitudinal dimension of at least 20 mm; and
    wherein the adsorbent particles are positioned in the adsorbent bed with a void fraction not more than 30%, and in an ordered configuration to provide substantially longitudinally extensive, substantially aligned gas channels by which the gas mixture to be separated can access the adsorbent material along the length of at least a proportion of the particles to cause adsorption of at least some of the contaminants and to form a purified gas product having a reduced content of the adsorbed contaminant material.

2. A process according to claim 1, wherein the core is a substantially non-permeable, solid core.

3. A process according to claim 1, wherein the adsorbent coating has a thickness of less than 1000 microns and greater than 1 micron, which coating thickness also has a uniformity such that a thickness standard deviation is less than about 40% of the thickness.

4. A process according to claim 3, wherein the adsorbent coating has a thickness of less than 500 microns and greater than 25 microns.

5. A process according to claim 1, wherein the adsorbent coating comprises a microporous material.

6. A process according to claim 5, wherein the microporous material is selected from zeolites, MOPs (metal organic frameworks), AlPOs, SAPOs, ZIFs, (zeolitic imidazolate frameworks), carbons, and combinations and intergrowths thereof.

7. A process according to claim 6, wherein the microporous material is a zeolite selected from DDR, CHA, MPI, Beta, FAU, and combinations and intergrowths thereof.

8. A process according to claim 1, wherein the adsorbent coating comprises a mixed matrix material.

9. A process according to claim 8, wherein the mixed matrix material is a polymer film comprising a polymer selected from silicone rubber and polyimides, and further comprises particles of zeolite.

10. A process according to claim 9, wherein the zeolite is selected from DDR, CHA, MPI, Beta, FAU, and combinations and intergrowths thereof.

11. A process according to claim 1, wherein the ordered adsorbent bed of particulate adsorbent particles comprises locally structured ordered regions in which the particulate adsorbent particles are laid down in the ordered configuration of substantially longitudinally extensive, substantially aligned gas channels.

12. A process according to claim 11, further comprising adhering the adsorbent particles together with an adhesive to form the locally structured ordered regions and removing the adhesive prior to contact with the gas stream.

13. A process according to claim 12, further comprising applying the adhesive to the adsorbent particles by spraying the adsorbent particles with the adhesive or passing the adsorbent particles through a bath of the adhesive.

14. A process according to claim 11, where an end-to-end dimension of the locally structured ordered regions is from about 5 cm to about 100 cm.

15. A process according to claim 1, wherein the adsorbent particles are in the form of hollow cylinders or hollow prismatic polygonal shapes having a central gas passage.

16. A process according to claim 1, wherein the adsorbent particles are in the form of prismatic polygonal shapes having cross-sectional irregularities that preclude maximal face-to-face contact of the particles in the ordered configuration.

17. A process according to claim 16, wherein the cross-sectional irregularities comprise irregular lengths of polygonal sides and/or irregular vertex angles.

18. A process according to claim 1, wherein the adsorbent particles have surface irregularities in the form of uniform roughness that preclude maximal face-to-face contact of the particles in the ordered configuration.

19. A process according to claim 1, wherein the adsorbent particles have a length to maximum cross-sectional dimension of the particle of at least 5:1.

20. A process according to claim 1, wherein the gas mixture is natural gas and the at least one contaminant is $CO_2$, $H_2S$, or a combination thereof.

21. A process according to claim 1, wherein the at least one contaminant is $CO_2$, $H_2S$, or a combination thereof.

22. A process according to claim 1, further comprising growing an intergrown film of adsorbent crystals directly on the exterior surface of the low permeability core to form the adsorbent coating.

23. A process according to claim 22, wherein the adsorbent crystals are comprised of a zeolite selected from DDR, MPI, CHA, and combinations and intergrowths thereof.

24. A process according to claim 1, wherein the adsorbent particles comprise an exterior longitudinal groove.

25. A process according to claim 1, wherein the adsorbent particles have a central gas passage and an exterior gas passage and the interior and exterior surfaces of the adsorbent particles comprise the adsorbent coating.

26. A process according claim 1, further comprising wash coating individual bound particles on the core to form the adsorbent coating.

27. A process according to claim 1, further comprising forming a porous inorganic oxide film on the surface of the core and imbibing an adsorbent liquid into the pore structure of the inorganic oxide film to form the adsorbent coating.

* * * * *